United States Patent [19]

Schneider

[11] Patent Number: 4,560,887
[45] Date of Patent: Dec. 24, 1985

[54] STANDBY POWER SUPPLY

[75] Inventor: John C. Schneider, Ann Arbor, Mich.

[73] Assignee: Northern Telecom Limited, Montreal, Canada

[21] Appl. No.: 564,388

[22] Filed: Dec. 22, 1983

[51] Int. Cl.[4] .................................................. H02J 9/06
[52] U.S. Cl. .......................................... 307/66; 307/86
[58] Field of Search ........................ 307/46, 48, 64, 66, 307/86

[56] References Cited

U.S. PATENT DOCUMENTS

| | | | |
|---|---|---|---|
| 3,509,357 | 4/1970 | Studtmann | 307/64 |
| 4,075,503 | 2/1978 | Klett | 307/66 |
| 4,124,103 | 11/1978 | Otto et al. | 187/29 R |
| 4,238,690 | 12/1980 | Clarke | 307/66 X |
| 4,247,913 | 1/1981 | Hiniker et al. | 365/228 |
| 4,335,434 | 6/1982 | Baumann et al. | 364/464 |
| 4,454,452 | 6/1984 | Feldstein | 307/66 X |
| 4,488,057 | 12/1984 | Clarke | 307/66 |
| 4,492,876 | 1/1985 | Colbert et al. | 307/66 |

OTHER PUBLICATIONS

"Specifying Uninterruptible Power Systems", by R. Caprigno et al, in Digital Design, Mar. 1983, pp. 88–91.

Primary Examiner—J. R. Scott
Assistant Examiner—Derek S. Jennings
Attorney, Agent, or Firm—Schwartz, Jeffery, Schwaab, Mack, Blumenthal & Evans

[57] ABSTRACT

A relatively short-term standby power supply includes a relay which senses failure of the main AC power source, and in response to such a failure actuates contacts which turn on a first thyristor to connect a capacitor to the load. The capacitor has been charged to a higher voltage than the load requires and can consequently provide power to the load for a longer time period than would the same size capacitor charged to the normal operating voltage of the load.

7 Claims, 2 Drawing Figures

STANDBY POWER SUPPLY

BACKGROUND OF THE INVENTION

The present invention relates generally to supplying energy to equipment during interruption of the normal energy supply. More particularly, the present invention involves supplying, on a short-term basis, electrical energy which has been stored in a capacitor bank to equipment when the normal AC (alternating current) source of energy fails.

Much equipment in commercial and industrial use today operates on commercially available AC (alternating current) power. Failures of this supply of AC power do occur and it is often desired to keep certain devices operating, even during such a failure. To this end the use of standby power supplies are well known.

Perhaps the simplest standby power supply available is the storage battery. It is known to monitor the AC power supply and when it fails the storage battery is connected to the equipment. For many kinds of equipment this is adequate. However, for other equipment such as computer and certain telephone equipment the delay involved in switching over to a standby battery (even a delay of one second, or less) can be disasterous; the data stored in the computer can be lost and telephone connections can be interrupted. Storage batteries also have the drawbacks that they are relatively expensive, they require maintenance, and they occupy relatively large amounts of space.

It is also known to use large capacitors in a power supply. These capacitors may provide a filtering effect, but they also store energy that can be supplied to the equipment in the event of a failure of the normal power source. The following U.S. patents describe this general technique: U.S. Pat. No. 4,124,103 dated Nov. 7, 1978 by P. R. Otto et al; U.S. Pat. No. 4,247,913 dated Jan. 27, 1981 by T. K. Hiniker et al; and U.S. Pat. No. 4,335,434 dated June 15, 1982 by K. Baumann et al. These patents all have in common, the concept of storing energy in capacitors at the normal operating voltage of the system. As a result, if more energy is to be stored, then capacitors having a larger capacity must be employed. This is disadvantageous because larger capacitors cost more and they occupy more space. Additionally, once the capacitors begin to discharge, the voltage across them drops and it soon becomes too low to power its load.

The article entitled "Specifying Uninterruptible Power Systems" by R. Caprigno et al in *Digital Design*, March 1983, pages 88 to 91 describes generally the principles underlying uninterruptible power systems.

SUMMARY OF THE INVENTION

The present invention is directed to providing an improved source of relatively short-term standby power. In simplistic terms, this improved source of standby power comprises a capacitor that is charged, by a voltage doubler circuit, to a voltage that is higher than that of the normal operating voltage of the equipment in question. The energy from this capacitor, when required, is routed to the equipment via an inductance; this inductance limits the flow of current so as to prevent a large initial inrush of current and to thereby maintain the voltage being applied to the equipment from being so excessive as to damage the equipment. A storage battery may also be provided for the eventuality that a longer power outage occurs.

Stated in other terms, the present invention is a means for supplying a load with a relatively short-term supply of direct current, the means characterized by: input means for accepting AC power from an external supply; rectifier means, responsive to the input means, for rectifying the AC power and transforming it into DC power at a first voltage magnitude; a capacitance means for storing energy at a second voltage magnitude wherein the second voltage magnitude is greater than the first voltage magnitude; a voltage multiplier means, responsive to the input means, for applying the second voltage magnitude across the capacitance means; a transformer having at least a first winding for carrying current from the rectifier means, and a second winding for carrying current from the capacitance means; and means for sensing the failure of the AC power and for connecting the capacitance means battery to the load, when the AC power fails.

BRIEF DESCRIPTION OF THE DRAWINGS

The invention will now be described in more detail with reference to the accompanying drawings wherein like parts in each of the several figures are identified by the same reference character, and wherein.

DETAILED DESCRIPTION

Figure 1:
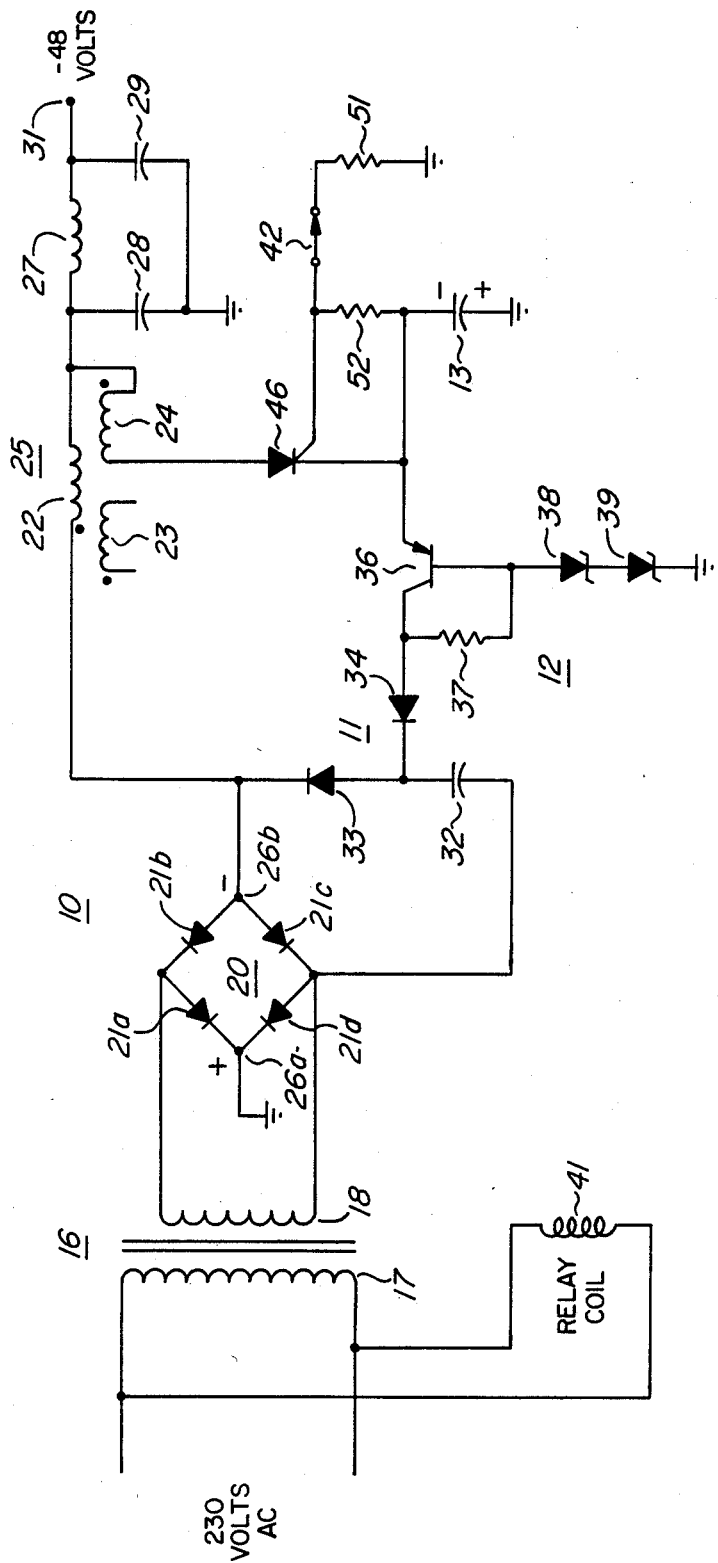
FIG. 1 is a simplified schematic of the preferred embodiment of the present invention.

FIG. 1 depicts the simplified schematics of a power supply 10, a voltage doubler 11, a voltage regulator 12, a standby energy source (i.e. capacitor 13), and related interfacing devices.

Power supply 10 comprises transformer 16 with primary winding 17 and secondary winding 18; diode bridge 20 comprising diodes 21a, 21b, 21c, and 21d; winding 22 of transformer 25; inductor 27; and capacitors 28 and 29. An alternating voltage is applied across winding 17 (e.g. 230 volts AC); winding 18 applies a reduced voltage (e.g. 36 volts AC, RMS) to diode bridge 20 which produces a rectified output (i.e. direct current) on its output terminals 26a and 26b with the polarity as depicted in the Figure. Terminal 26a is connected to ground, and terminal 26b is applied to winding 22 of transformer 25 which is in turn connected to inductor 27. Note that the output of inductor 27, on terminal 31, is approximately −48 volts DC. Note also that inductor 27, together with capacitors 28 and 29, form a filter for power supply 10. The power rating for supply 10 is 4000 watts.

Capacitor 32, diode 33, and diode 34 are connected so as to form a voltage multiplier, to charge capacitor 13 to a voltage level higher than that of the peak-to-peak voltage across the ends of winding 18. The actual voltage is controlled by voltage regulator 12 comprised of transistor 36, resistor 37, and zener diodes 38 and 39. In the embodiment depicted, the voltage across capacitor 13 is approximately 56 volts DC.

When the main source of power fails (i.e. the AC power supplied to winding 17 of transformer 16) relay coil 41 becomes unenergized and causes relay contacts 42 to move to their depicted positions in FIG. 1 (i.e. contacts 42 become closed).

When contacts 42 close, thyristor 46 is turned on, allowing current to flow from capacitor 13, through thyristor 46, winding 24, and inductor 27 to terminal 31. Current inrush into capacitor 28 is limited by the inductance of winding 24. Resistors 51 and 52 provide biasing for thyristor 46. Winding 23 is not used in the FIG. 1 embodiment.

If the main source of power should be turned back on prior to capacitor 13 completely discharging, thyristor 46 could be held in the on state due to the capacitor charging current supplied by transistor 36; transformer 25 prevents this from occurring by inducing into winding 24 a current which opposes the current flow through thyristor 46. At the point where the net sum of the current flow through thyristor 46 is approximately zero, thyristor 46 turns off. Capacitor 13 then charges up once again to be ready to repeat the entire process.

Figure 2:
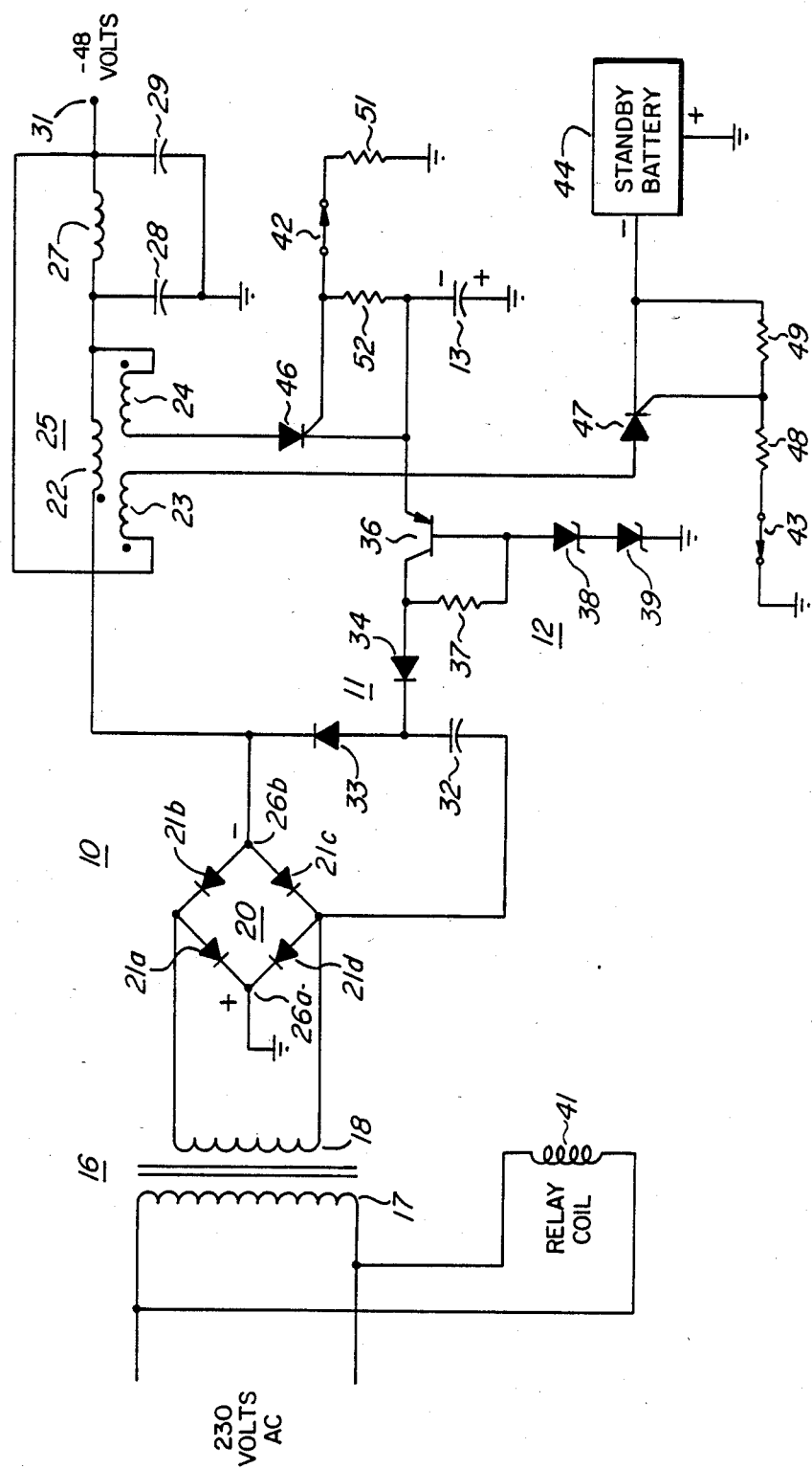
FIG. 2 is the same as FIG. 1 but additionally includes provision for a battery.

FIG. 2 is the same as FIG. 1 but additionally includes standby battery 44 and associated equipment. The circuit of FIG. 1, with the size of capacitor 13 depicted, can accommodate power interruptions of approximately 250 milliseconds or less. With the circuit of FIG. 2, power interruptions of much longer duration can be accommodated.

Contacts 43 are controlled by relay coil 41 and are closed, as depicted in FIG. 2, when the AC power supplied to winding 17 fails. The closing of contacts 43 causes thyristor 47 to turn on and power is supplied to terminal 31 via thyristor 47 and winding 23 is depicted.

Note that the circuit of FIG. 1 could accommodate power interruptions greater than 250 milliseconds if the size of the capacitor 13 were increased, or the magnitude of the voltage applied to it were increased, or a combination of the two.

| Component Values | |
|---|---|
| Transformer 25: | hand wound on a 3 inch air core; each winding is 9 turns wound in "tri-filar" fashion |
| Capacitor 13: | 0.48 Farads |
| Capacitor 28: | 0.3 Farads |
| Capacitor 29: | 0.35 Farads |
| Capacitor 32: | 50 micro-farads |
| Resistor 37: | 1.3K ohms |
| Resistor 51: | 5K ohms |
| -continued | |
| Component Values | |
| Resistor 52: | 5K ohms |
| Inductor 27: | 120 micro-henries |
| Diodes 38 & 39: | 50.3 volts (total) |

What is claimed is:

1. Means for supplying a load with a relatively short-term supply of direct current, said means characterized by:
   input means for accepting AC power from an external supply;
   rectifier means, responsive to said input means, for rectifying said AC power and transforming it into DC power at a first voltage magnitude;
   a capacitance means for storing energy at a second voltage magnitude wherein said second voltage magnitude is greater than said first voltage magnitude;
   a voltage multiplier means, responsive to said input means, for applying said second voltage magnitude across said capacitance means;
   a transformer having at least a first winding for carrying current from said rectifier means, and a second winding or carrying current from said capacitance means; and
   means for sensing the failure of said AC power and for connecting said capacitance means to said load, when said AC power fails.

2. The means of claim 1 wherein said voltage multiplier means is a voltage doubler.

3. The means of claim 2 wherein said second voltage magnitude is approximately twice said first voltage magnitude.

4. The means of claim 3 wherein said capacitance means is a capacitor.

5. The means of claim 1 wherein said input means is a transformer.

6. The means of claim 5 wherein said means for sensing the failure of said AC power is a relay having its coil connected to said input means.

7. The means of claim 6 wherein said capacitance means provides power to said load, when said AC power fails, for a maximum duration of approximately 250 milliseconds.

* * * * *